(12) United States Patent
Ruegenberg

(10) Patent No.: US 6,186,675 B1
(45) Date of Patent: Feb. 13, 2001

(54) METHOD AND APPARATUS FOR THERMAL FUSING OF OPTICAL FIBERS

(75) Inventor: Gervin Ruegenberg, Munich (DE)

(73) Assignee: Siemens Aktiengesellschaft, Munich (DE)

(*) Notice: Under 35 U.S.C. 154(b), the term of this patent shall be extended for 0 days.

(21) Appl. No.: 09/139,122

(22) Filed: Aug. 25, 1998

(30) Foreign Application Priority Data

Aug. 27, 1997 (DE) .............................................. 197 37 358

(51) Int. Cl.[7] .................................................. G02B 6/255
(52) U.S. Cl. .............................................. 385/96; 385/97
(58) Field of Search ................ 385/95–99; 156/158–159

(56) References Cited

U.S. PATENT DOCUMENTS

| | | | |
|---|---|---|---|
| 5,011,259 | 4/1991 | Lieber et al. ........................ | 385/96 |
| 5,078,489 | 1/1992 | Lieber ................................. | 385/15 |
| 5,226,995 | * 7/1993 | White ................................. | 385/96 |
| 5,581,646 | * 12/1996 | Tsukamoto et al. ................. | 385/96 |
| 5,588,087 | * 12/1996 | Emmons et al. .................... | 385/96 |
| 5,638,476 | * 6/1997 | Zheng ................................. | 385/96 |

FOREIGN PATENT DOCUMENTS 0 400 408  12/1990 (EP) .

* cited by examiner

*Primary Examiner*—Hemang Sanghavi
(74) *Attorney, Agent, or Firm*—Schiff Hardin & Waite

(57) ABSTRACT

Two incipiently fused fiber ends are fused to one another by being pushed one inside the other in a longitudinal direction beyond the end face contact site by a variable amount, which is increased in proportion to the greater extent of the poorer quality of the end face as compared to the desired shape of the end face.

20 Claims, 8 Drawing Sheets

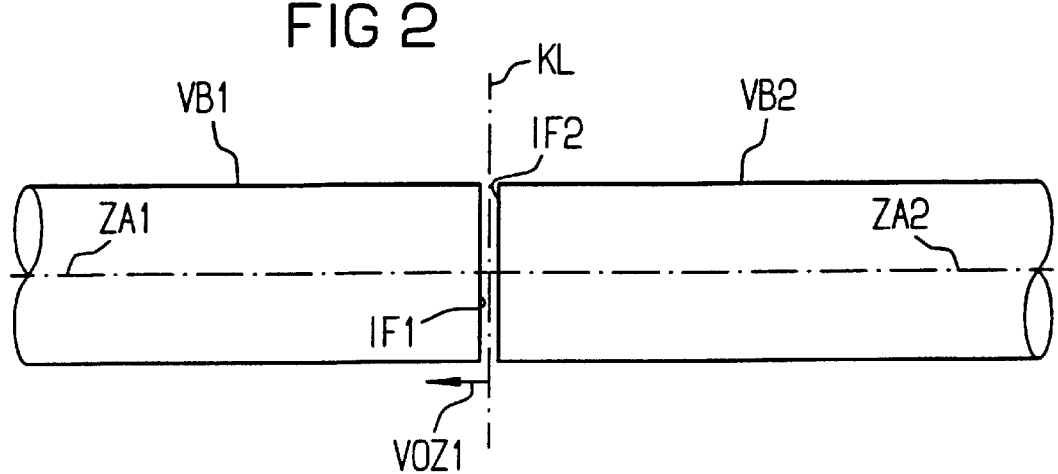
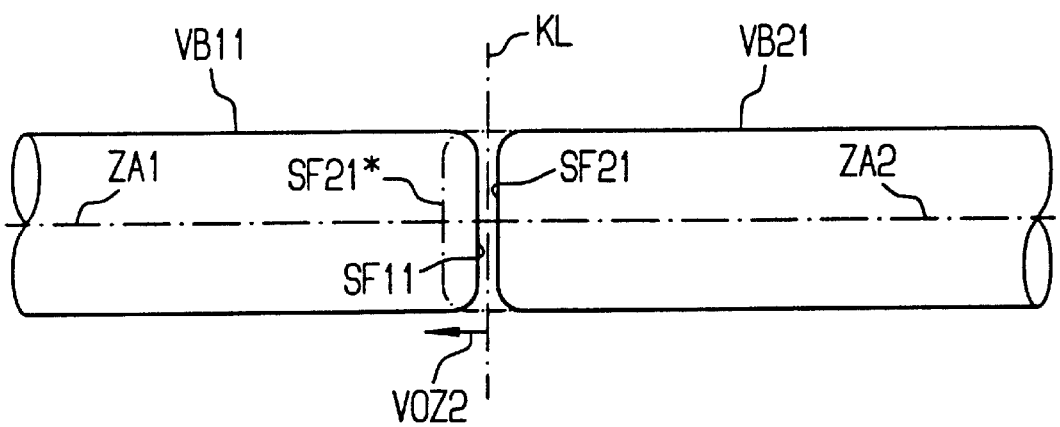

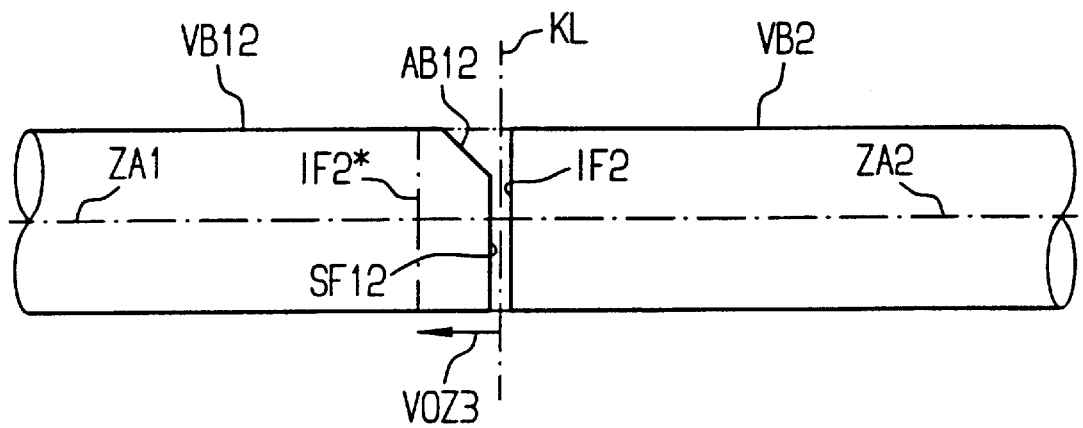
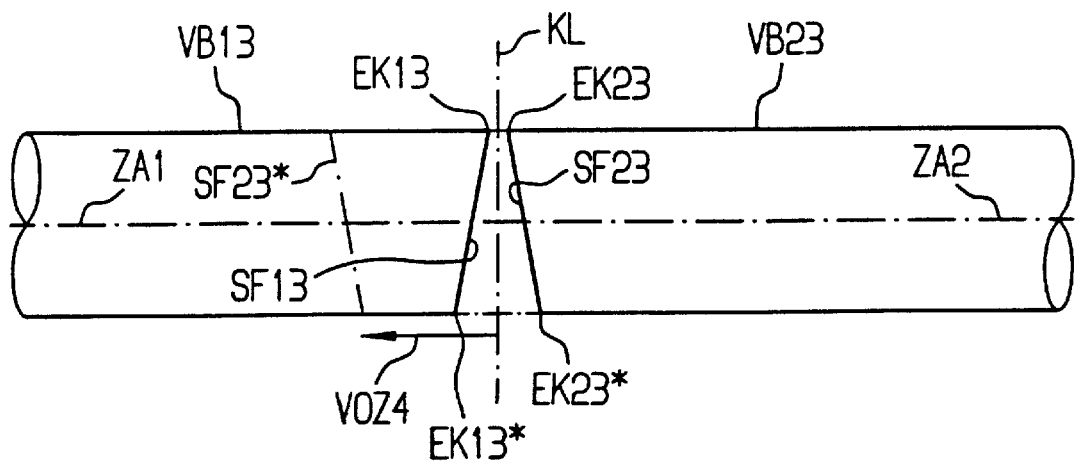

METHOD AND APPARATUS FOR THERMAL FUSING OF OPTICAL FIBERS

BACKGROUND OF THE INVENTION

The present invention is directed to a method for thermally fusing two mutually aligned optical fiber ends and to an apparatus for accomplishing the method.

Bringing together the fiber ends incipiently fused at their end faces can be particularly critical for producing a fused connection between the ends of the two optical fibers, which connection is acceptable as possible and, that is to say, to produce a fiber splice which has, as far as possible, the same cross-sectional geometry as is typical for the respective fiber throughout its entire remaining longitudinal length. Thus, for example, possible mispositioning of the fiber ends relative to one another leads to unacceptably high splice losses. A method by means of which it is possible to detect such mispositioning of two fiber ends to be fused in a fashion aligned flush with one another is disclosed in U.S. Pat. No. 5,011,259, whose disclosure is incorporated herein by reference thereto and which claims priority from the same German Application as European Patent No. 0 400 408. As disclosed, the two fiber ends are illuminated and an image thus produced of the fiber ends is scanned using an image sensor of a video camera. If the respective fibers have impermissibly high material deficits at the end faces, which can be caused, for example, by material vaporization, breaking-out of portions of the glass material, faults in the angular fracture or the like, it becomes yet more difficult for the fiber ends to be brought together and obtain an acceptable splice.

SUMMARY OF THE INVENTION

It is an object of the present invention to provide a method by which the ends of the two optical fibers can be fused to one another as acceptably as possible and to provide a fused connection, which can be provided, as far as possible, with fiber cross-sectional geometry. In accordance with the invention, this object is achieved in the case of a method which includes incipiently heating the fiber ends, pushing the fiber ends inside one another in the fiber longitudinal direction beyond the end face contact site by a longer feed path, which feed path is determined by the departure of the end face shape of each fiber from a desired end face shape with the increase in the feed path being proportional to the increase in the departure of the end face shape from the desired end face shape.

Acceptable fusing of the two fiber ends is thereby rendered possible under a multiplicity of practical conditions.

The invention is also directed to a device for thermal fusing of two mutually assigned optical fiber ends, which is characterized in that the incipiently fused fiber ends are provided with displacing means which push the incipiently fused fiber ends one inside the other in the fiber longitudinal direction beyond their end face contact site by a variable feed path which increases in proportion to the departure of the shape of the end face from the desired end face shape.

Other advantages and features of the invention will be readily apparent from the following description of the preferred embodiments, the drawings and claims.

BRIEF DESCRIPTION OF THE DRAWINGS

FIGS. 2–5 show enlarged diagrammatic representations of various cases of the projection plane with an optical image of the two fiber ends which are to be fused to one another, wherein FIG. 2 shows the ideal situation;

FIG. 3 shows a partial departure from the ideal situation and the amount of movement inside one another to overcome the partial departure;

FIG. 4 shows another example of a departure from the ideal situation and the amount of movement to overcome this defect; and FIG. 5 shows a third variation of a departure from the ideal situation;

DESCRIPTION OF THE PREFERRED EMBODIMENTS

Figure 1:
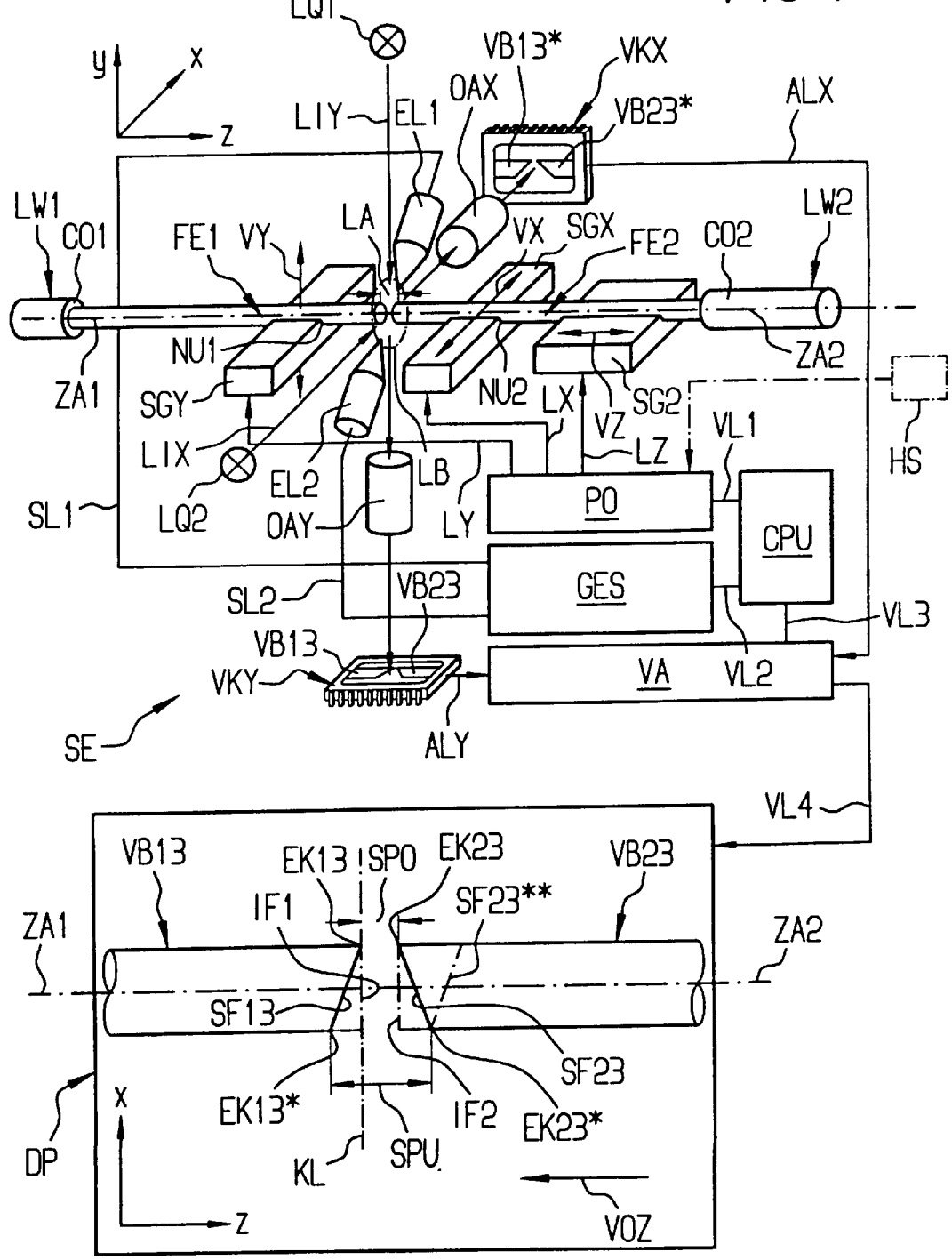
FIG. 1 is a diagrammatically perspective representation of the basic design of a device for carrying out the method in accordance with the present invention.

The principles of the present invention are particularly useful when incorporated in a device, generally indicated at SE in FIG. 1. The device SE can thermally fuse two optical waveguides LW1 and LW2 to one another using a method according to the present invention. The fusing device SE can, thus, in this case, preferably, be a component of an optical waveguide splicer. In the fusing device SE of FIG. 1, the end faces of the two optical waveguides LW1 and LW2 are initially opposite one another at a prescribable axial longitudinal spacing. The respective optical waveguides LW1 and LW2 extend approximately along a straight line in this case. In the end region of the first and second optical waveguides LW1 and LW2, the external plastic coating, which may be a primary and/or a secondary coating, is removed along a prescribed end length in each case to form bare optical fibers FE1 and FE2, which are made of a glass material. This cutting-back of the optical waveguide coating is expediently carried out before the fusing of the two optical waveguides LW1 and LW2, in particular, still before inserting the respective optical waveguide LW1 or LW2 into the fusing device SE. In addition to this, it is possible, if appropriate, for a prescribable end-side partial length to be severed or cut off from the respectively exposed optical fibers FE1 and FE2 in order to prepare in advance for the respective optical fiber FE1 or FE2 end face, which is as planar as possible and is as far as possible perpendicular, that is to say at an angle of 90° to the central axis ZA1 or ZA2 of the optical fibers FE1 and FE2, respectively.

The exposed optical fiber ends FE1 and FE2 are retained in the fusing device SE of FIG. 1, in each case, by at least one assigned, appropriate holding or positioning device of a known design, such as, for example, manipulators. To give details, in the present example, the first optical fiber FE1 is assigned to the holding device SGY, while the second optical fiber FE2 is assigned to the holding device SGX. To render it possible for the two ends of the two fibers to be placed opposite one another in the longitudinal direction and the two optical fibers FE1 and FE2 to thus be aligned flush with one another as far as possible before they are fused, at least one of the two holding devices SGY and SGX is constructed to be displaceable in at least one spatial direction transverse, and preferably perpendicular or orthogonal, to the respective fiber longitudinal axis. In FIG. 1, the holding device SGY, for example, permits a movement in the Y-direction, which is indicated by the double-arrow VY, and the second holding device SGX permits movement in the X-direction, which is indicated by the double-arrow VX, and the directions Y and X are of a Cartesian coordinate system X, Y and Z. In order to be able to move the ends of the two optical fibers FE1 and FE2 up to one another in the fiber longitudinal direction and to make mutual contact between them for the purpose of forming the fused connection, the second optical fiber FE2 is assigned, by way of example in FIG. 1, an additional holding or positioning device SGZ by means of which the optical fiber FE2 can be moved into the first optical fiber FE1 in the fiber longitudinal direction, that is to say the Z-direction, which is indicated by the double-arrow VZ. Each of the individual holding or positioning devices SGY, SGX and SGZ can be actuated, in each case, via an associated control line LY, LX and LZ by an appropriate positioning control unit, in particular by at least one actuator PO, and the devices are displaced in the respective directions Y, X and Z.

If appropriate, the holding devices can also be constructed in each case in such a way that they can be moved by hand into the respectively desired spatial position; in particular via a manual control HS, which is indicated in FIG. 1 by dot-dashed lines, and the actuator PO can also receive control signals for adjusting the positioning devices SGY, SGX and SGZ as appropriate.

Thus, in general terms, the two optical fibers FE1 and FE2 are provided with holding or positioning devices, of which at least one is constructed to be displaceable in at least one spatial direction. The holding or positioning devices preferably permit displacement movements of the two optical fibers in all three spatial directions of the Cartesian coordinate system. The spatial direction Z in this case specifies a longitudinal direction, that is to say the desired line of flush alignment, along which the optical fibers FE1 and FE2, in particular with respect to their fiber cores, are to be aligned flush with one another. The spatial direction X runs in the transverse direction relative to the longitudinal extent of the two optical fibers FE1 and FE2, in particular perpendicular, that is to say orthogonal to the spatial direction Z.

The holding devices SGY, SGX and SGZ of FIG. 1 are preferably situated, in this case, in a common plane of position, which is arranged approximately parallel to the plane defined by the X-direction and the Z-direction. The spatial direction Y is perpendicular to this X-Z plane, that is to say that it runs upward or downward therefrom.

In order to carry out the alignment operation, the two optical fibers FE1 and FE2 are initially moved apart from one another in the Z-direction so far that their end faces are positioned at a defined axial longitudinal spacing from one another.

Setting the longitudinal spacing can be performed in this case with the aid of a central computing and control device CPU. The control device can instruct the actuator PO via a control line VL1 to displace the holding device SGZ with the second fiber FE2, which is fixed in position on it, in the Z-direction as appropriate.

The fusing device SE of FIG. 1 has at least one optical imaging system in order, in each case, to be able to record an optical image for the fiber end of the respective optical fibers FE1 and FE2 in at least one viewing plane and to provide the image information thereof for evaluation. Light beams LIY are directed, in particular, essentially perpendicular to the X-Z plane onto the ends of the two optical fibers FE1 and FE2 with the aid of a light source LQ1 of a first imaging system in order to produce projection images of the two fiber ends, for example in the X-Z plane. Shading of the light beams LIY by the fiber ends occurs in this case. The light source LQ1 preferably sends a colored or white light in the direction of the fiber ends and illuminates them. It is expedient to provide a light-emitting diode or lamp as the light source LQ1 for this purpose. The imaging optical system OAY is arranged in the beam path of the light beam LIY on the side of the optical fibers FE1 and FE2 opposite the light source LQ1. The imaging optical system OAY is represented as a circular cylinder and preferably represents an objective system which has several individual lenses. With the imaging optical system OAY, the ends of the optical fibers FE1 and FE2 are projected as shadows VB13 and VB23 onto a surface or imaged in an image plane which lies in the X-Z plane. The shadows or projections VB13 and VB23 of the ends of the optical fibers FE1 and FE2 are recorded or picked up with the aid of a pickup device, in particular a scanning device VKY, in this projection plane, with the result that an intensity distribution is obtained for each fiber image or each shadow image VB13 and VB23. A video camera whose image sensor is of a rectangular construction is preferably provided as the pickup device VKY of the first imaging system. During the transillumination of the optical fiber ends, the respective bare, that is to say completely decoated, optical fibers preferably act like cylindrical lenses for the light penetrating the ends. The functioning and mode of operation of this imaging system are described in the above-mentioned U.S. Pat. No. 5,011,259. It is possible using this image system for the optical fibers FE1 and FE2 to be aligned substantially flush with one another with respect to their outer contours. For this purpose, the image information of the fiber images VB13 and VB23 is transmitted via a line ALY to a storage device VA, in particular to a video image storage unit, and stored there for evaluation purposes. The pickup device VKY preferably has an array of light-sensitive elements or light-measuring cells, in particular photodiodes, which are arranged in several mutually perpendicular rows and columns. The rows of image sensors preferably extend in the Z-direction, while the columns run in the X-direction. In this way, and in the case of rectangular image sections of the X-Z viewing plane, which is recorded by the pickup device VKY and on which the fiber images fall, is scanned pixel-by-pixel, that is to say measuring cell-by-measuring cell.

The evaluation of the images picked up can expediently be carried out in this case with the aid of the computing and control device CPU, which is connected to the storage device VA through the line VL3. In particular, the intensity values of the fiber images VB13 and VB23 are recorded pixel-by-pixel with the given resolution of the pickup device VKY, stored in the storage device VA, and control signals for aligning the fiber ends with one another in the X-Z plane are obtained from these intensity or brightness values. Thus, via the control line VL1, the computing device CPU instructs the actuator PO to displace the holding device SGX in the X-direction until the possible lateral offset of the fiber images VB13 and VB23 is reduced to zero in the X-direction, as a result of which the alignment of the optical fibers in the X-Z plane is then largely flush with respect to their fiber cores and/or outer contours.

By analogy with this, it is possible, as the case may be, to undertake a largely flush alignment of the optical fiber ends with respect to their fiber cores or outer contours in other planes of position, such as, for example, the Y-Z plane of FIG. 1. In order to align the fiber ends in the Y-Z plane, for example, that is to say in the plane perpendicular to the X-Z plane, in the case of the fusing device of FIG. 1, a light source LQ2 of a second imaging system directs light beams LIX in the X-direction perpendicular to the Y-Z plane onto the fiber ends FE1 and FE2, with the result that the latter are illuminated. On the side of the fibers which is opposite the light source LQ2, the light beams shaded by the fiber ends FE1 and FE2 are imaged with the aid of an imaging optical system OAX, which is constructed in accordance with the first imaging optical system OAY, in a projection plane which lies in the Y-Z plane. Projection images or shadows VB13* and VB23* are obtained in the Y-Z plane for the two illuminated fiber ends FE1 and FE2 in a way similar to the X-Z projection plane with the aid of a pickup device VKX corresponding to the pickup device VKY. The image information of these images VB13* and VB23* is transmitted via a line ALX to the storage device VA and provided there for evaluation with the aid of the computing device CPU. In particular, the intensity values of the fiber images VB13* and VB23* are recorded pixel-by-pixel with the given resolution of the pickup device VKX stored in the storage device VA, and control signals for aligning the fiber ends with one another in the Y-Z plane are obtained from these intensity or brightness values. With the control line VL1, the computing device CPU instructs the actuator PO to displace the holding device SGY in the Y-direction until the possible lateral offset of the fiber images VB13* and VB23* is reduced to zero in the Y-direction, as a result of which the alignment of the optical fibers in the Y-Z plane is then largely flush with respect to their fiber cores and outer contour.

It is possible in this way to undertake a multi-dimensional alignment of the fiber ends, that is to say to align them with one another in several different planes of position. IN particular, the total radial offset of the two fiber ends relative to one another can be determined by virtue of the fact that their spatial position relative to one another is determined in at least two viewing planes.

If appropriate, it may also already be sufficient to provide for the two fibers FE1 and FE2 holding devices which are arranged fixed in the lateral direction with respect to the fiber longitudinal axes, that is to say which permit no lateral displacement movement of the two fiber ends relative to one another, but only relative movement in the fiber longitudinal direction. Thus, in the fusing device of FIG. 1, the two holding devices SGX and SGY can also be installed in a fixed fashion, that is to say immovably. In the case of this simplified variant design of the fusing device, the holding device, such as SGY and SGX of FIG. 1, are expediently permanently aligned with one another, preferably at the time they leave the factory, in such a way that their insertion grooves NU1 and NU2 for the fibers FE1 and FE2 are always largely flush with one another. Of course, if appropriate, it can also be expedient for the two optical fibers FE1 and FE2 to be aligned flush with one another with respect to their fiber cores or outer contours with the aid of other standard alignment methods.

It is preferred, for this purpose, to be able to measure the attenuation of measuring light which is transmitted via the air gap between the two fiber ends. When the transmission of the transferred measuring light is the greatest, that is to say the attenuation thereof is the least, there is a flush alignment of the fiber cores. The function and mode of operation of this attenuation method are described in detail in U.S. Pat. No. 5,078,489, whose disclosure is incorporated herein by reference thereto.

The relative position of the two fiber images in the respective viewing planes relative to one another is visualized in the case of a fusing device SE with the aid of a display device, such as a display DP. The display device DP is connected, for this purpose, to the storage device VA by a data line VL4. The display DP shows the images VB13 and VB23 of the two fiber ends FE1 and FE2 in, for example, the X-Z viewing plane, specifically in a state after the two fiber ends FE1 and FE2 have already been aligned largely flush with one another respectively in the X-direction and the Y-direction, but are not yet in contact with one another at the end faces.

On either side of the longitudinal extent of the two exposed optical fibers FE1 and FE2, the fusing device of FIG. 1 respectively has at least one fusing electrode EL1, EL2, that is to say the two fusing electrodes EL1 and EL2 are arranged on mutually opposite longitudinal sides of the optical fibers FE1 and FE2. In particular, the fusing electrode EL1 is situated opposite the fusing electrode EL2 offset by approximately 180°. The two fusing electrodes EL1 and EL2 serve as a thermal heat source and are aligned in this arrangement to the interspace between the two holding devices SGY and SGX in such a way that it is possible for a so-called electric arc to form between them in each case by means of a glow discharge in a fashion transverse to the axis, in particular perpendicular to the longitudinal extent of the optical fibers FE1 and FE2. The boundary of the region in which an electric arc is propagated in each case between the two electrodes EL1 and EL2 is indicated in FIG. 1 with the aid of a dot-dashed ellipse LB. The two fusing electrodes El1 and EL2 are connected via associated current lines SL1 and SL2 to a glow discharge generator GES, in particular to a voltage source of the pulse generator for generating voltage pulses. In this arrangement, the glow discharge generator GES can be driven with the aid of a computing and control device CPU via a control line VL2.

After an initially possibly present lateral, in particular radial offset, of the two fiber ends has largely been reduced to zero by appropriately displacing the holding devices SGX and SGY, the glow discharge arc LB is struck between the two electrodes EL1 and EL2 in order to pre-fuse the two fiber ends FE1 and FE2. The fiber ends FE1 and FE2 are separated from one another at a defined longitudinal spacing LA, and are then moved up to one another in the Z-direction with the result that they are both caught by the electric arc LB for a prescribable prefusing period. For this purpose, the second optical fiber FE2 is moved with the aid of the holding device SGZ in the Z-direction toward the first optical fiber FE1, which is supported, in particular retained, fixed in position with respect to the Z-direction in its holding device SGY. In detail, the two fibers are preferably moved between the electrodes, the glow discharge is then started and pre-fusing time is waited through and then, once the electric arc has been extinguished, the fibers are moved up to one another along their desired flush line in the Z-direction until they make contact with one another at the end faces. In the display DP of FIG. 1, the dot-dashed straight line KL marks the desired joint or contact site for the end faces of the two fiber ends FE1 and FE2 or for their respective images VB13, VB23 in the X-Z plane. The line KL extends essentially in the X-direction and simultaneously forms a desired line of symmetry for the overall arrangement of the two fibers directly where it is intended their end faces will make contact. The feed movement of the second fiber end FE2 in the Z-direction up to the first fiber end FE1 is indicated in the display DP by means of an arrow VOZ. The end faces of the fiber ends FE1 and FE2, respectively, are denoted in the X-Z viewing plane by SF13 and SF23, respectively.

In order to produce, between the two fiber ends FE1 and FE2, as acceptable as possible, a fused connection with a cross-sectional geometry which corresponds essentially to the cross-sectional geometry of the two fibers along their remaining longitudinal extent, in accordance with the present invention, the incipiently fused fiber ends are pushed one inside the other in the fiber longitudinal direction beyond their intended contact site KL at the end faces by a longer feed path or excess travel the more their end faces depart from a desired end face shape. Within the scope of the present invention, the term "excess travel" or "feed path" is to be understood in this case particularly as that segment in the fiber longitudinal direction along which the fused glass material of the two fiber ends penetrates one another, that is to say mix and fuse with one another.

A largely planar fiber end face, to which the central axis of the fiber end is essentially perpendicular, is preferably selected as the desired end face of the respective fiber end. The image of such an idealized fiber end face, both for the first fiber end FE1 and for the second fiber end FE2, is also respectively illustrated in the display DP by dots and dashes in the X-Z viewing plane and provided with the reference symbols IF1 and IF2, respectively. Thus, in the respective viewing plane, the X-Z projection plane here, for example, ideal fiber ends each have a projection image with an outer contour which is preferably as rectangular as possible, that is to say viewed in three-dimensional terms, the desire form for the respective fiber end is ideally for a geometry which is as far as possible a circular cylinder with a plane end face in relation to which the fiber central axis forms a surface normal and through whose midpoint the fiber central axis passes. In the case of such fiber ends with respect to the contact line KL, the end faces thereof would come into contact in an axially symmetrical fashion and largely over the entire surface, that is to say in the respective viewing plane, the visibly imaged edges of the ideal end faces IF1 and IF2 would touch one another on the desired contact line KL essentially along their entire projection width.

In practice, however, the fiber ends have end faces which depart more or less from this desired end face shape IF2 or IF2, and this is illustrated in FIGS. 3–5. Drawn here by way of example in the X-Z viewing plane in each case are diagrammatic images of the two fiber ends FE1 and FE2 with end faces of different shapes, that is to say different end face qualities. In this case, for the purpose of better illustrating their fiber excess travel into one another, the two fiber ends FE1 and FB2 are shown in each case in FIGS. 3–5 in a first state at the start of their movement up to one another, in which their rend faces are still situated opposite with a longitudinal spacing, as well as in dots and dashes in the final state of their movement into one another.

In FIG. 2, the two opposite ideal fiber ends, in each case with a largely rectangular outer contour VB1 and VB2 in the X-Z viewing plane are illustrated. The rectangular shape is actually, of course, only the side view of a cylindrical shape. Each fiber end, thus, has an essentially ideal end face IF1 and IF2, respectively, which is largely of planar construction and encloses an angle of approximately 90° relative to the central axis ZA1 or ZA2.

By contrast with this, FIG. 3 illustrates two fibers which, viewed in three-dimensional terms, each have a rounded-off part in the transition region between the cylindrical outer surface and the circular 90° end face. The images of the fibers rounded-off in such a way are denoted in FIG. 3 by VB11 and VB21. The end face of the first optical fiber, which is rounded-off at its outer edge, is provided in FIG. 3 with the reference symbol SF11, while in a fashion corresponding to this, the rounded-offend face of the second fiber FE2 is provided with the reference symbol SF21. The image of the respective fiber in FIG. 3 thus differs from its desired rectangular outer contour of FIG. 2 by the rounding-off of its rectangular corners. Thus, by contrast with the ideal fiber ends of FIG. 2, the fiber ends of FIG. 3 each have a material deficit at the end face. This material deficit is in the edge region of the respective fiber end and can be caused, for example, by vaporization of its incipiently fused glass material during the pre-fusing operation, that is to say the period before and during which the two fiber ends are moved up to one another at their end faces as far as their contact site KL and are exposed in the process to the electric arc, that is to say thermally heated. Such a material deficit only in the edge regions of the respective fiber ends, which regions are actually annular circular regions, can also be caused, in particular, by virtue of the fact that during pre-fusing of the fiber ends and before the two fiber ends come into contact with one another at their end faces, a liquid surface film of the glass material of the respective fiber is formed. To be precise, because of the surface tension of the fused glass material, it is possible for material transport to take place out of the outer edge of the fiber end face region and consequently for rounding-off of the fiber end face to occur.

In addition, it can also happen on occasion that the respective fiber already has material removed at its end faces before pre-fusion starts. This is the case in FIG. 4, for example, for the first optical fiber, which has an image VB12 in the X-Z observing plane which has an obliquely-extending rupture surface AB12 in the upper corner or edge region at the transition from the cylindrical surface to the remainder of the end face, extending along the contact line KL. By contrast with the rectangular image of the first fiber of FIG. 2, in FIG. 4, a triangular part of the glass material is now removed in the upper corner of the first fiber end. It may be assumed here, by way of example, for the fiber arrangement of FIG. 4 that the material removed at the end face of the first fiber produces a larger material deficit than in FIG. 3 between the two rounded-off fibers, which first touch one another at the contact line KL. This material deficit can be caused, for example, by virtue of the fact that the 90 0 end face, originally cut flat, of the first fiber strikes in its edge region, that is to say in the transition zone between the lateral surface of the cylindrical and the circular end face of the first fiber, against a splicer component when being inserted into the splicer, and, thus, a splinter of glass material is inadvertently knocked off. Thus, a first fiber end with a unilateral fiber excision in the upper corner region of its fiber end face and a second fiber end with an ideally rectangular outer contour are situated opposite one another along the contact line KL in FIG. 4.

In FIG. 5, the image VB13, in the left-hand half of the illustration of the first fiber end, has a plane end face SF13 which, by contrast with the desired 90° ideal end face of FIG. 2, is skewed by a fault angle. The fiber central axis ZA1, thus, no longer forms a surface normal to the skewed end face SF13. In the plane of the illustration of FIG. 5, the visible edge of the end face SF13 extend, when viewed from left-to-right from bottom left to top right, as an oblique straight line. Thus, by contrast with the ideal rectangular projection image VB1 of FIG. 2, the first fiber image VB13 of FIG. 5 lacks a triangular area at the end face. The image VB23 of the second fiber end FE2 in the right-hand half of the illustration of FIG. 5 also has an approximately planar end face SF23 which is skewed by a specific fault angle by contrast with the desired 90° ideal end face of FIG. 2. The visible edge of the skewed end face SF23 extends, viewed in the direction from right-to-left, along an oblique straight line from bottom right to top left. Thus, the second fiber end of FIG. 5, likewise, lacks a triangular area at the end face by contrast with the ideal rectangular image VB2 of FIG. 2. The visible edges of the end faces SF13 and SF23 thus run up to one another and intersect in their imaginary extension on the contact line KL. When moving up to one another, the two ends do not make contact with one another at all, except with the upper edges of their end faces or the rupture edges EK13 and EK23. This is because the corners EK13 and EK23 project the farthest from the respective fiber end face into the interspace between the two opposite fiber ends. The missing material triangles of the end faces of the fiber ends FE1 and FE2 widen in this case toward the same longitudinal side of the fiber arrangement. The point is that in FIG. 5, the fiber end faces SF13 and SF23 do not run parallel to the contact line KL in the X-direction, but up to one another. Such skewed fiber end faces running up to one another result at the contact site of the two fiber ends in an even larger material deficit than in the case of the fiber arrangement according to FIG. 4, since a triangular gap region whose height corresponds approximately to the fiber diameter remains between the fiber ends, which make contact only at the upper corner. A skewed fiber end face can occur, in particular, owing to the fault in the angle of fracture when cutting off or severing the respective optical fiber when carrying out the preliminary measures to prepare the fiber.

The fiber pair of FIG. 5 is also indicated in the display DP of FIG. 1. However, there, the two ends have not yet come into contact with one another but are opposite one another at an angular longitudinal spacing SPO.

In summary, thus, the optical image is produced for the respective fiber end, and its image information is provided for evaluation. The image information from the respective fiber image is used to determine, by comparison, the depar-ture thereof from a desired fiber image. In this case, it is expedient actually to record the end face quality of the fiber ends before they are moved up to one another or are pre-fused.

In particular, a fiber image is produced for the respective fiber end in at least one viewing plane with the aid of the imaging system according to FIG. 1. If appropriate, it is also possible, for example with the aid of at least one eyepiece or objective, to view the respective fiber end face with the naked eye in at least one side view and estimate or assess the quality thereof.

Figure 6:
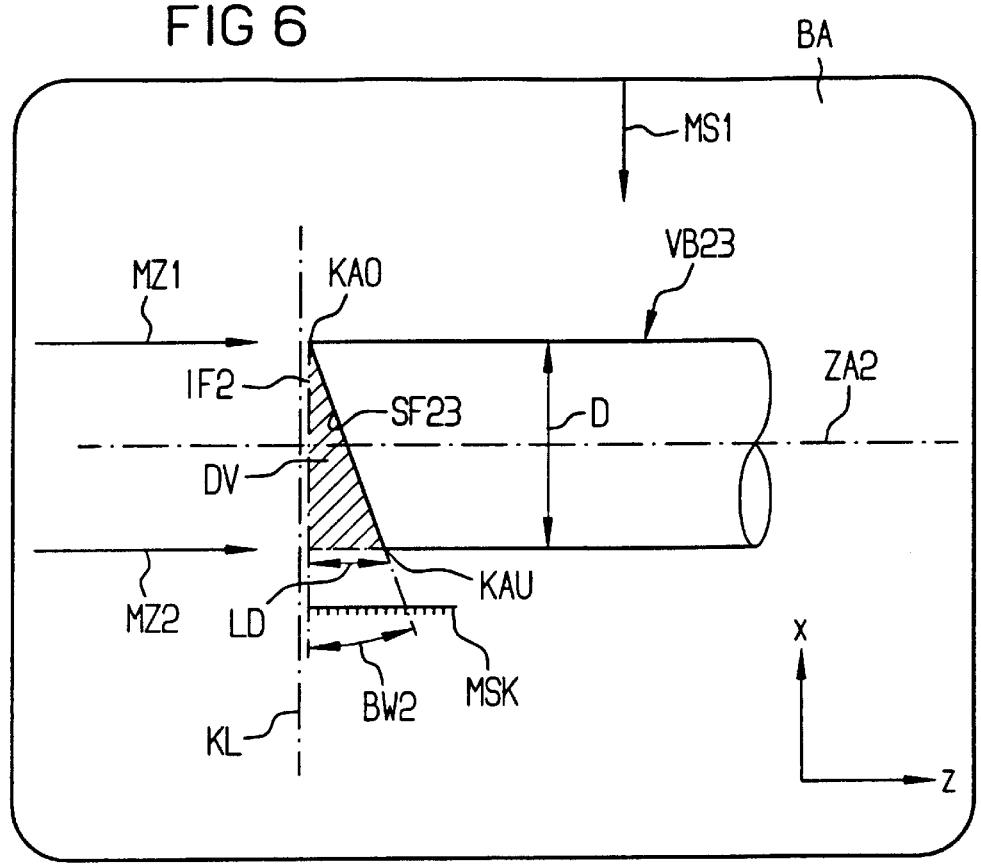
FIG. 6 is an enlarged detailed geometric relationship of the end faces of the second end of one fiber end illustrated in FIG. 5.

In order to be able to provide an objective measurement of the degree of departure of the respective fiber end from the desired geometrical fiber shape, the following departure criteria are determined from the image information of the respective fiber ends:

1. In at least one viewing plane, the axial longitudinal spacing between the end face rupture edges of the fiber end on the opposite longitudinal sides thereof can be used as a first departure criterion by means of which possible differences between the shape of the respectively existing fiber end and the desired ideal geometrical shape can be characterized to a first approximation. The determination of this departure criterion is explained by way of example with the aid of FIG. 6, which shows an enlarged image VB23 of the fiber end FE2 of FIG. 5 in the X-Z viewing plane. The fiber end FE2 illuminated with the aid of the imaging optical system of FIG. 1 is projected as a rectilinearly extending strip which is incipiently cut obliquely at the end face. The fiber image thus has a trapezoidal outer contour at the end face. This means, in other words, that the longitudinal sides of the strip-shaped fiber image are formed by straight lines which run essentially parallel to the central axis ZA2 and are arranged at a radial spacing therefrom. In FIG. 6, the two longitudinal sides of the fiber image are preferably situated axially symmetrically relative to one another with respect to the central axis ZA2. Referred to the desired contact line KL, the upper longitudinal side of the image projects beyond the lower longitudinal side thereof. Whereas the upper edge of the fiber image extends up to the contact line KL, the lower fiber longitudinal edge already terminates at a distance from the contact line KL at the axial longitudinal spacing LD. The upper edge of the end face of the fiber image is denoted in FIG. 6 by KAO and the lower edge by KAU. The upper edge KAO is connected to the lower edge KAU by an obliquely running straight line SF23. In the X-Z viewing plane, this is the obliquely running plane end face of the second fiber FE2. An overhang is formed because of the fact that the upper edge KAO projects farther than the lower edge KAU in the direction of the contact line KL. In FIG. 6, the area which results as the difference between the existing fiber image and the desired rectangular geometrical shape is shaded by hatching and is denoted by DV. This area DV is of a triangular construction in the X-Z viewing plane. Thus, the end face SF23 is inclined by a fault angle BW2 by contrast with an ideal fiber image of a rectangular shape, in which the end face runs essentially parallel to the contact line KL in the X-direction. The plane fiber end face SF23 is therefore skewed by the fault angle BW2 with respect to the desired 90° ideal end face IF2. The axial longitudinal spacing LD between the upper and lower rupture edges KAO and KAU at the end face of the fiber image can serve as a particularly simple measure or criterion of the classification for the departure of the existing from the desired fiber geometric shape in the X-Z viewing plane. The larger the axial longitudinal spacing LD between the edges KAO and KAU on opposite longitudinal sides of the fiber image becomes, the larger the material deficit becomes by contrast with an ideal rectangular outer contour. If both rupture edges KAO and KAU are assigned to the same longitudinal fiber location, the result is an axial longitudinal spacing LD of approximately zero, that is to say the fiber end face runs essentially parallel to the contact line KL and forms a desired 90° end face with the axis of the fiber and no end face material deficit will exist for such a fiber.

The axial longitudinal spacing LD between the end face fiber rupture edges can, for example, be determined by evaluation of the brightness values of the fiber image stored in the storage device VA of FIG. 1 with the aid of the computing unit CPU. Specifically, at the location of the rupture edges of the fiber, a change occurs in the brightness of the intensity values which were picked up.

With the aid of the respective scanning device, such as, for example, VKY of FIG. 1, a rectangular image section is preferably recorded in each case in the associated viewing plane, such as, for example, the X-Z imaging plane. The rectangular image section which is recorded by the scanning device VKY of FIG. 1 is also illustrated in FIG. 6 and denoted by BA. Since the second fiber end FE2 effects shading in the beam path of the light beam LIY, it is imaged in the image section BA as a darker shadow against a bright background. If the image section BA is scanned, for example, in a linewise fashion in the fiber longitudinal direction, that is to say the Z-direction here, it is initially impossible to record any significant change in the brightness lasting over several pixel values and approaching statistical fluctuations in the empty, upper image half when the pixels traverse the respective measuring line in the Z-direction. Not until the measuring line MZ1 in the Z-direction, on whose pixels or measuring cells of the upper edge of the second fiber end FE2 is imaged, do the intensity values of the pixels change from the position of the front fiber rupture edge KAO from bright to dark and then also remain dark along the rest of the longitudinal extent of the fiber. The measuring line MZ1 thus has a higher intensity value from the left-hand edge of the image section BA up to the front rupture edge KAO of the fiber image than along its remaining longitudinal extent from the rupture edge KAO up to the right-hand image edge. A specific longitudinal Z-direction can then be assigned to that pixel of the measurement line MZ1 from which the change in brightness occurs. Finally, the measuring line MZ2 in the Z-direction in which a change in the brightness values from bright to dark occurs for the last time over several pixels is also found when the image section BA is further scanned through in a linewise fashion. After the measuring line MZ2, there is finally no more change in brightness in the subsequent image lines of the empty lower image half. That image pixel from which the difference in intensity occurs can likewise be assigned a specific longitudinal Z-location in the imaging or measuring line MZ2. This is then the longitudinal location of the lower edge KAU of the fiber image. A possible axial offset for the upper and lower strip edges, that is to say their axial longitudinal spacing relative to one another, can be determined in this way by forming the difference between the longitudinal Z-locations. The larger the axial longitudinal spacing LD of the fiber rupture edge on opposite fiber longitudinal sides, the more skewed the end face SF23 with respect to the desired 90° end face IF2 and the poorer the end face quality of the fiber FE2. If, by contrast, no axial longitudinal spacing LD can be determined between the two rupture edges KAO and KAU, the end face quality can be assessed as being in order. It is sufficient with this measuring method simply to determine how far the ruptured edges KAO and KAU are offset relative to one another in the axial direction. The relative longitudinal difference LD can thus be determined in a simple way by forming the difference between those numbers of pixels for which a bright/dark change occurs in the measuring lines for the first and last time, respectively. Thus, the larger the number of pixel values between the longitudinal location of the upper rupture edge KAO and the lower edge KAU, the more strongly inclined is the end face SF23 with respect to the 90° ideal end face IF2.

A possible positional offset of the two fiber rupture edges KAO and KAU relative to one another can be detected and determined in this way. This can preferably be performed automatically with the aid of the computing unit CPU of FIG. 1 by having the units examine the fiber images stored in the storage device VA in accordance with the above principle.

It can also suffice, as the case may be, to have the user read off a possible longitudinal offset of the rupture edges from the fiber image shown on the display DP with the naked eye. It can be expedient for this purpose to provide the desired contact line KL in the X-direction as a marker line on the display. It is then possible by actuating the appropriate manipulators for the respective fiber end to be displaced in the Z-direction until the fiber end face comes into contact for the first time with the contact line KL. In order now to be able to determine, in particular to quantify, the axial longitudinal spacing between the upper and lower rupture edges of the end face of the respective fiber end, it can be expedient additionally to provide a length scale MSK in the Z-direction of the display DP. The zero point of the scale MSK is preferably on the contact line KL.

2. It is also possible, if appropriate, to use as a further departure criterion the fault angle by which the end face of the respective fiber end is skewed with respect to the desired end face. In FIG. 6, the end face SF23 of the fiber image is inclined with respect to the desired 90° end face IF2 and, thus, also with respect to the desired contact line KL by the fault angle BW2. The fault angle BW2 is yielded approximately in this case in a simple way in accordance with the relationship BW2=arctan (LD/D), wherein D is the width of the shadow image in the X-direction, that is to say corresponding to the outside diameter of the fiber FE2, and wherein LD is the axial longitudinal spacing between the upper and lower rupture edges KAO and KAU of the fiber image VB23.

The width D of the shadow image VB23 can be determined in a simple way by counting off those pixels which lie between the measuring line MZ1 and the measuring line MZ2 in the X-direction. If appropriate, it can also be expedient to carry out a scan in the X-direction over the entire image height, that is to say to scan the image section BA along a measuring column MS1 which records both the upper and lower longitudinal sides of the fiber image VB23 which is horizontal in FIG. 6. The column location at which the intensity value of the measuring column MS1 changes from bright to dark as well as the column pixel for which the intensity value of the measuring column MS1 changes again from dark to light then specifies the edges of the fiber image viewed in the X-direction. The difference between these two edges viewed in the X-direction then yields the width D, that is to say the outside diameter of the fiber image VB23. The larger the fault angle BW2 becomes, the larger the end face material deficit becomes, and the poorer is the end face quality of the fiber FE2.

3. The material deficit which the respective fiber end lacks by contrast with the fiber end with the desired end face, can be determined as a further preferred departure criterion. In FIG. 6, the shaded hatched triangular area DV characterizes that region in that the fiber end FE2 lacks glass material by contrast with the desired rectangular geometrical shape IF2 of an ideal fiber end. Assuming that the ideal fiber end is of a circular cylindrical construction, the fiber end FE2 of FIG. 6, viewed in three-dimensional terms, lacks a material volume of $V=(LD\ \pi D^2)/8$ in the triangular region DV, with LD being the difference in length between the image rupture edges KAO and KAU and with D being the imaged fiber outside diameter.

4. Finally, the differential area, which the currently existing fiber image lacks by contrast with the desired rectangular area in the respective view plane, can also be used in the respective fiber image as an additional departure criterion from the ideal state. In FIG. 6, the triangular differential area DV, which the currently existing fiber image lacks, by contrast with the ideal rectangular image, is calculated approximately according to the following relationship:

$$DV = \tfrac{1}{2} D \cdot LD$$

A measure of the differential area can preferably also be obtained by determining the number of the pixels of high brightness in the gap between the two fiber ends currently touching one another on the desired contact line KL. The larger the number of pixels in the bright gap, through which the light beams penetrate, the larger is the material deficit of the fiber ends by contrast with the ideal state in which the end faces ideally touch one another along the contact line KL, that is to say in the X-direction along the entire fiber diameter.

If appropriate, it can also be expedient to determine for the respective fiber end alone that number of pixels which lie in the material deficit area. For this purpose, the respective fiber end, such as FE2 in FIG. 6, for example, is preferably displaced so far in the Z-direction that its end face comes into contact for the first time with the contact line KL. It is then possible to add up the number of pixels or image points which possible lie between the contact line KL and the fiber end face, such as, for example, SF23, and have brighter intensity values by contrast with the shadow image. Their sum then specifies a reliable measure of the size of the missing area at the end face of the fiber end. It can be just as expedient to add together the intensity values of these pixels in the missing region. The larger the intensity value becomes, the larger is the departure of the existing fiber end from the desired state.

5. It can be particularly expedient to determine a possible material deficit in the interspace between the two fiber ends FE1 and FE2 overall. This is preferably performed before the two fiber ends touch each other at the intended desired contact line KL, but are positioned at an axial longitudinal spacing from one another. In the display DP of FIG. 1, the two images VB13 and VB23 of the fibers FE1 and FE2 are opposite one another at an axial longitudinal spacing SPO when viewed along their upper longitudinal side, that is to say their two fiber end corners EK13 and EK23, which are to move the farthest onto one another and are at an axial longitudinal spacing SPO from one another. This minimum gap width, when viewed in the Z-direction, of the trapezoidal gap interspace between the two fiber images VB13 and VB23 is determined in a first measuring step. Corresponding to this, the maximum gap width SPU between the two fiber images VB13 and VB23 is determined in a second measuring step. This is the axial longitudinal spacing between the two images VB13 and VB23 along their lower longitudinal sides, which is to say the two fiber end corners EK13* and EK23* most widely separated from one another are at an axial longitudinal spacing SPU from one another. The differential amount between the maximum and minimum gap width equal to SPU-SPO then forms a measure of how much glass material is lacking overall for the two fibers, viewed together, by contrast with the ideal image, illustrated with dots and dashes, of the fibers with a rectangular outer contour IF1 and IF2 when in the same position, that is to say the geometrical shape of a circular cylinder when viewed in three-dimensional terms.

In practice, an overall criterion of departure from the ideal arrangement can be determined in a particularly simple fashion for such a fiber arrangement of two fiber ends opposite one another at a longitudinal spacing by scanning the opposite longitudinal sides of the fiber images VB13 and VB23 with one measuring line each in the Z-direction and respectively counting in this measuring line the number of pixels or pixel points which appear brighter in the trapezoidal gap between the two fiber ends than the fiber shadow images VB13 and VB23. The number of pixels, that is to say the number of light-sensitive elements or measuring cells of the image sensor, for example in the measuring line MZ1 between the upper fiber end corners EK13 and EK23, is then a measure of the minimum gap width SPO. The number of pixels in the measuring line between the two lower fiber end corners EK13* and EK23* on the opposite longitudinal side of the fiber arrangement is a measure of the maximum gap width SPU. The difference between these two pixel sums forms a useful criterion for assessing how large is the material deficit of the entire fiber arrangement owing to the departure of the shape of one or both fiber ends to be fused to one another from their desired geometric shape. If the second fiber FE2 were to have an end face which ran approximately parallel to the end face of the first fiber FE1 according to the above procedure, the results would be a differential value of approximately zero as the difference in the length between the gap widths of the two gaps of two opposite longitudinal sides of the fiber image. A dotted and dashed end face SF23, which runs approximately parallel to the end face SF13 of the first fiber, is illustrated by way of example for the second fiber image VB23 in the X-Z plane in the display DP of FIG. 1**. Specifically, in such a fiber arrangement, there would be precisely no material gap, since these fibers come into contact with one another over their entire area at the end face.

Thus, in generalized terms, in the respective viewing plane along at least two measuring lines which are offset laterally from one another with respect to the fiber central axes, the gap width of the resulting gap between the fiber end faces is respectively measured in the fiber longitudinal direction. Then, the differential signal of these two determined gap widths is formed, thus making available a defined measured variable for quantifying the material deficit of the fiber arrangement by contrast with the desired three-dimensional shape thereof.

At least one such departure criterion is determined for the respective fiber end in at least one viewing plane. If appropriate, it is also possible to use several departure criteria simultaneously for assessing the end face quality of the respective fiber end.

In this way, at least one departure criterion is available by means of which a possible departure of the currently existing fiber image from the desired geometric shape of the fiber can be classified and/or evaluated.

On the basis of at least one of these departure criteria, the feed path for pushing the incipiently fused fiber ends one inside the other is now controlled. This means, in other words, that the two incipiently fused fiber ends to be fused to one another are pushed more on inside the other in the fiber longitudinal direction beyond their end face contact site when the end face quality is poorer. Depending on the departure criterion, in FIG. 1, the computing unit CPU instructs the actuator PO to move the positioning device SGZ with the second fiber FE2 in the Z-direction beyond the contact line KL into the glass melt of the first fiber FE1. While the fused glass material of the fiber ends is being pushed one inside the other beyond the contact line KL of FIG. 1, the fiber ends remain exposed in the process to the electrical arc, that is to say they are brought thermally up to at least the melting point. After the fused fiber ends have been pushed one inside the other, they are kept at this melting point until a largely homogeneous fused connection has formed between them.

Thus, in summary, the feed path of the two fiber ends, in contrast to their end faces, beyond their contact site is selected to be larger the larger the extent of the departure of their end faces from the ideal state. This finely graded selection of the path of the fiber excess travel in the case of pushing the fused fiber ends together one inside the other beyond their end face first contact site is illustrated by way of example in FIGS. 2–5, specifically as a function of their end face quality.

The ideal end faces IF1 and IF2 of the two imaged fiber ends VB1 and VB2 are visible in FIG. 2 as straight lines which run parallel to the desired contact line KL in the X-direction. Since the two fiber ends FE1 and FE2 of FIG. 2 have planar end faces which are at an angle of 90° to their central axes ZA1 and ZA2, they come into contact for the first time over their entire area at the contact line KL. In order to produce an acceptable fused connection between the two fiber ends FE1 and FE2, that is to say for the purpose of adequately fusing the two fiber ends FE and FE2 to one another, it already suffices in this theoretical ideal case merely to bring into contact the end face fused material. The feed path VOZ1 is then exceptionally equal to zero. There is thus, as yet, no thickening at the site of the fused connection between the two fibers FE1 and FE2. The fused connection between the two fibers FE1 and FE2 then has essentially the same geometrical shape as the two fibers FE1 and FE2 along their remaining longitudinal extent. This means, in other words, that the original fiber cross-sectional geometry is continuously maintained beyond the fused connection site. Thus, in the interior of the glass material, the fiber cores, which are fused to one another, of the two fibers FE1 and FE2 run essentially along a common line of alignment in the Z-direction. The mutually fused lateral glass surfaces of the two fibers FE1 and FE2 in this case have an outside diameter which corresponds to the original fiber outside diameter.

By contrast with the two fiber ends of FIG. 2, which largely have ideally shaped end faces, the two fibers of FIG. 3 to be fused to one another have rounded end faces SF11 and SF21. This case occurs regularly in practice because of the pre-fusion. If these two rounded end faces SF11 and SF21 come into contact with one another for the first time at the contact site KL, and annular gap remains there at the outer circumference. This annular gap is approximately of funnel-shaped construction in the viewing plane of FIG. 3. The gap projects into the fiber interior only along a partial length of the radial fiber thickness. Differently from the fiber ends of FIG. 2, the fiber ends of FIG. 3 now come together in the case of the contact line KL only in the region about the fiber center, while their end faces no longer make contact with one another at the outer edges. Owing to this annular gap, the material deficit remains between the fiber ends. The two incipiently fused fiber ends are therefore moved one inside the other at least so far that their material deficit is corrected. By contrast with FIG. 2, the glass material of the two fiber ends of FIG. 3, which is fused at the end face, is therefore pushed one inside the other beyond the contact line KL by a longer feed path VOZ2 in order to be able, as far as possible, to correct and close the material deficiency in the annular gap by appropriately feeding material afterwards. The penetration of the fused end face of the second fiber FE2 into the fused glass material of the end face of the first fiber end FE is shown in FIG. 3 by using a dot-dashed line to illustrate the course of the end face of the second fiber FE2 after the feed movement has been carried out and is denoted by a surface SF21*. Since, owing to the material vaporization, the material deficit is substantially influenced by the fiber heating which is set, whereas the fiber heating is, in practice, always approximately the same during the production of the fiber fused connections, this material deficit component can be taken as a constant in a simplified consideration. It can therefore be taken into account by a constant, additive component of the fiber excess travel. It therefore does not need to be determined anew for each individual fiber fused connection to be newly produced.

In FIG. 4, the first fiber end has, on its upper edge, a material excision or gap AB12 for which it is assumed that, by contrast with the fiber arrangement of FIG. 3, it leads to a still larger material deficit in the contact region of the two fiber end faces SF12 and IF2. To correct this material deficit, the glass material fused at the end face of the second fiber end FE2 is moved into the glass material fused at the end face of the first fiber FE1 beyond the contact line KL by yet a longer or larger feed path VOZ3>VOZ2. Moving the second fiber end FE2 forward by the feed path VOZ3 into the fiber end FE1 fused at the end face is illustrated in FIG. 4 by using dot-dashed lines IF2* to illustrate the final course of the end face of the second fiber end FE2 in the image plane VB12 of the first fiber.

If, as in FIG. 5, the two fiber ends even have skewed end faces which run up to one another, contact occurs between the fiber end faces for the first time solely at a single site on the desired contact line KL. These are also rupture edges which, viewed in the fiber longitudinal direction, project the farthest in the direction of the contact site KL. As a result, by contrast with FIG. 4, an even greater enlarged gap is formed between the fiber end faces which come into contact for the first time. This gap is of a triangular construction in FIG. 5 and extend over virtually the entire length of the fiber diameter. Since the two fiber ends of FIG. 5 depart even more strongly from the desired geometrical shape of the fiber than in FIG. 4, they are pushed one inside the other beyond their contact line KL by an even longer or larger feed path. In the case of the use of the fusing device SE of FIG. 1, the fiber end FE2 is moved into the glass material, fused at the end face of the first fiber end FE1 by a feed path VOZ4>VOZ3>VOZ2>VOZ1. The course of the fiber end face of the second fiber end after the feed movement has been carried out is illustrated in FIG. 5 by the dot-dashed line SF23*.

In the case of rounded fiber ends, the feed path is selected to be at least equal to 0.3 $\mu$m, and particularly lies in a range of between 1 $\mu$m and 5 $\mu$m. If fiber excisions or material splintering occurs at the fiber ends, as in FIG. 4, the feed path is preferably selected to be at least 1 $\mu$m, and preferably in a range between 1 $\mu$m and 10 $\mu$m. If the fiber end faces have faults in the angle of fracture, as illustrated in FIG. 5, for example, the feed path is selected to be at least equal to 1 $\mu$m, and preferably is in a range of 1 $\mu$m to 3 $\mu$m.

The entire depth of penetration into one another of the fiber ends fused at the end face is preferably selected in practice in such a way that at least that overall material deficit that the existing fiber ends have, by contrast with their desired geometrical shape of the fiber, is corrected.

The path length for the excess travel of the fibers one inside the other can also be controlled, in particular, as a function of the possibly resulting gap area between the fiber ends still situated opposite at the longitudinal spacing. In this case, the gap can be measured before starting or during the movement of bringing the fiber ends together. It is preferred to determine the gap area when the fiber ends are first brought into contact in the respective viewing plane. For this purpose, the fiber ends are moved up to one another in the Z-direction to such an extent that their end faces approximately touch on the desired contact line KL. If an interspace remains between the two end faces, it is penetrated by the light beams. It therefore appears brighter than the fiber ends in the respective viewing plane. The gap size can therefore be determined in a simple way by counting the number of pixels or image points between the two fiber ends, which have larger intensity values than the image points recorded by the fiber images, that is to say are brighter than the image points affected by the fiber projection. The larger the number of pixels of higher brightness in the interspace between the two fiber ends, the larger is the material deficit area between the two fiber ends and the larger the selected feed path must be.

It can be particularly expedient to use the volume of the material deficit of the respectively existing geometrical shape of the fiber by contrast with the desired geometrical shape as an input variable for calculating the fiber feed path. To simplify matters, the fiber feed path can be controlled in a fashion proportional to the volume of the material deficit. In particular, the feed path of the fiber respectively being moved forward can be set in such a way that feeding its subsequently fed material volume suffices to correct its material deficit. If, as in FIG. 1, only the second fiber end is pushed up to the fixed, first fiber end FE1, its total movement path VOZ is selected in such a way that the glass material of the second fiber fed up into the first fiber suffices to correct the total material deficit of the two fiber ends. If both fibers are simultaneously moved up to one another, their individual feed path is set in such a way that each fiber contributes in proportion, depending on its material deficit, to the material correction of the gap between the two mutually opposed end faces.

Figure 7:
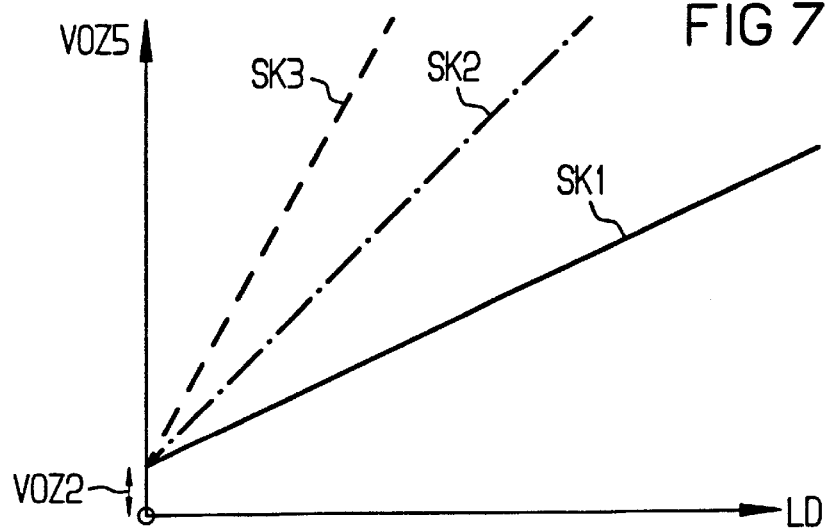
FIG. 7 is a diagrammatic representation for carrying out the method according to the invention showing various control characteristics for the feed path of the respective fiber end beyond the contact site.

FIG. 7 shows, by way of example, various control characteristics for the feed movement of an individual fiber end, such as the second fiber end VB23 of FIG. 6, for the case in which only its own end face material deficit is at least compensated for, that is to say made up. It is, therefore, assumed in this case, that the associated first fiber has an ideal 90° end face, while the end face of the second fiber is skewed, as represented in FIGS. 5 and 6. Plotted along the abscissa of the characteristic diagram of FIG. 7 as departure criterion is the axial longitudinal spacing LD between the rupture edges KAO, KAU of the fiber end face SF23 of FIG. 6, while the path of the fiber excess travel VOZ5 is assigned to the ordinate of the diagram. The straight line SK1 running at a gradient of 0.5 is the control characteristic for that part of excess travel which just permits material correction. The control characteristic SKI results from the following simple consideration:

The fiber end of FIG. 6 lacks, as material volume V1, half of a circular cylinder of a diameter D and a height LD. It therefore holds that the volume $V1=\frac{1}{8}(\pi D^2)LD$. The correction of this material deficit can then be performed by subsequently feeding fused glass material of an entirely cylindrical fiber section with a length VOZ5 of appropriate size, it holding for the material volume V2 thereof that $V2=\frac{1}{4}(\pi D^2)VOZ5$. A constant feed component VOZ2 is provided independent of LD in order to correct the rounding of the fiber end faces, which always occurs in practice, as shown in FIG. 3. Thus, if the missing material volume is equal to the material volume subsequently fed, the result is the linear relationship VOZ5=0.5LD+VOZ2, which is the control characteristic of line SK1 of FIG. 7.

By contrast with the control characteristic SK1, the control characteristic SK2 of the dot-dashed line of FIG. 7 renders it possible to ensure overcompensation for the purpose of filling up the material deficit by means of an appropriately enlarged feed path. Finally, an even steeper straight line SK3, shown in dashes in FIG. 7, corrects the material deficit more than in proportion.

At least one of the control characteristics is expediently implemented in the computing and control device CPU of FIG. 1 as a function or in a tabular form. In order to produce the respective fused connection, that is to say for each new pair of fiber ends which are to be fused with one another, the fiber images are generated in at least one viewing plane, for example with the aid of the fusing device of FIG. 1. The information of the fiber images is then used to determine at least one departure criterion, such as LD, for example, for each fiber individually or for the entire fiber arrangement, that is to say for both fiber ends together. This departure criterion then serves as input parameter for the corresponding control characteristic, which supplies the corresponding excess travel path of the fiber as output parameter. Of course, it can also be expedient to make the control characteristic available to the user of the splicer as a function curve or table in paper form, so that the operator can set the excess travel path respectively required on the splicer by hand.

Figure 8:
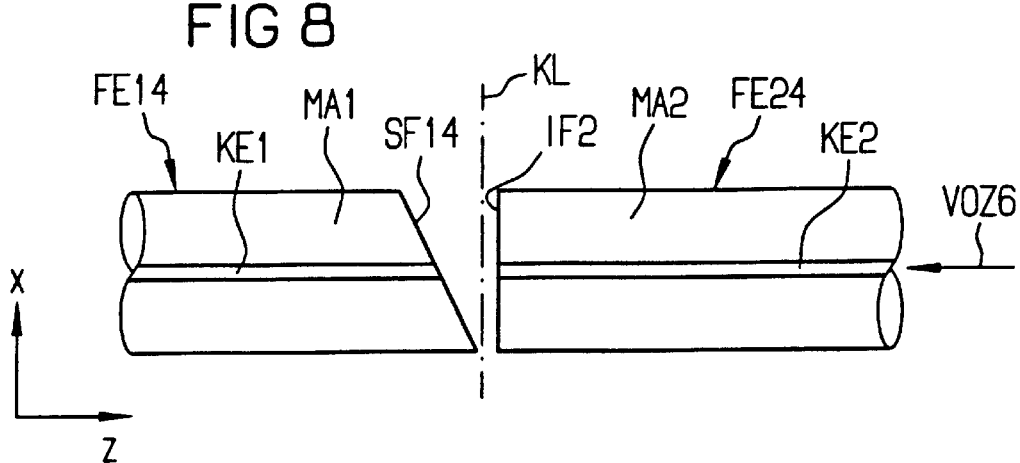
FIG. 8 is an enlarged representation of a projection plane with the optical images of two fiber ends to be fused to one another in accordance with the present invention.

FIG. 8 shows a diagrammatic and enlarged representation of a projection plane with the optical images of two fiber ends FE14 and FE24, which are to be fused to one another according to the present invention. FIG. 8 preferably reproduces the X-Z viewing plane of FIG. 1. Situated opposite one another in the image plane of FIG. 8 at the desired contact line KL are the first fiber ends FE14 with a skewed end face SF14 and a second fiber end FE24 with a planar 90° end face IF2. FIG. 8, in addition, illustrates the outer contour of the fiber projections in the course of the fiber cores of the first and second fibers. The fiber core KE1 of the first fiber FE14 runs essentially centrally therein and, in a corresponding way, the course of the fiber core KE2 of the second fiber FE24 is also centrally located. The two fiber cores KE1 and KE2 thus run along a common line of alignment in the Z-direction. In FIG. 8, the lower corner edges of the fiber end faces just come into contact at the intended contact line KL, whereas otherwise a gap region remains free between their end faces SF14 and IF2. Viewed overall, there is thus a triangular region free from material between the two end faces SF 14 and IF2. To be able to fuse the fiber ends to one another, they are brought up to the melting point in the region of their end faces SF14 and IF2 so that their glass material softens. In order to be able to produce as homogeneous fused a connection as possible between the two fiber ends, the fiber excess travel VOZ6 of the second fiber FE24 into the softened glass material of the first fiber FE14, fixed here in the example in the Z-direction, is selected in such a way that this material deficit is corrected precisely for the end face of the first fiber FE14. The second fiber FE24 is therefore pushed in the fiber longitudinal direction into the glass material, which was softened at the end face of the first fiber beyond the contact line KL by such a feed path VOZ6 that so much glass material is advanced that the material gap is exactly closed. The feed path VOZ6 then, preferably, corresponds to half the length difference determined between the upper and lower rupture edge of the first fiber face SF14.

Figure 9:
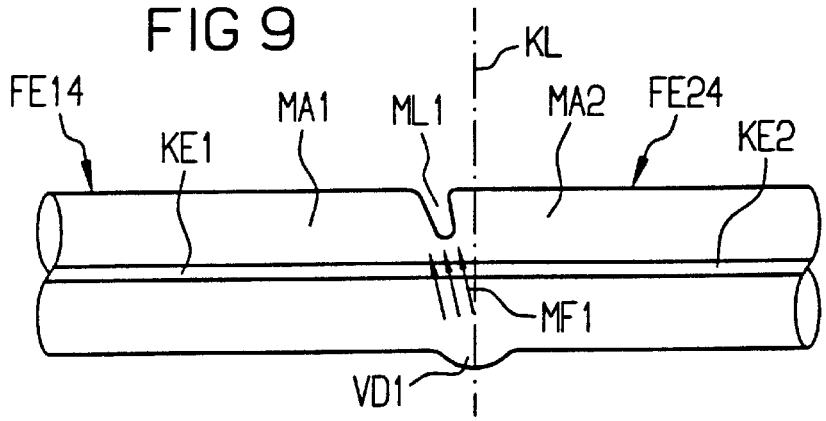
FIGS. 9 and 10 are diagrammatically enlarged representations of the resulting material flow and conditions of the fused glass material of the two fiber ends of FIG. 8 immediately after the incipiently fused end faces have been pushed one inside the other, with FIG. 9 showing a shorter feed path than the feed path illustrated in FIG. 10.
Figure 11:
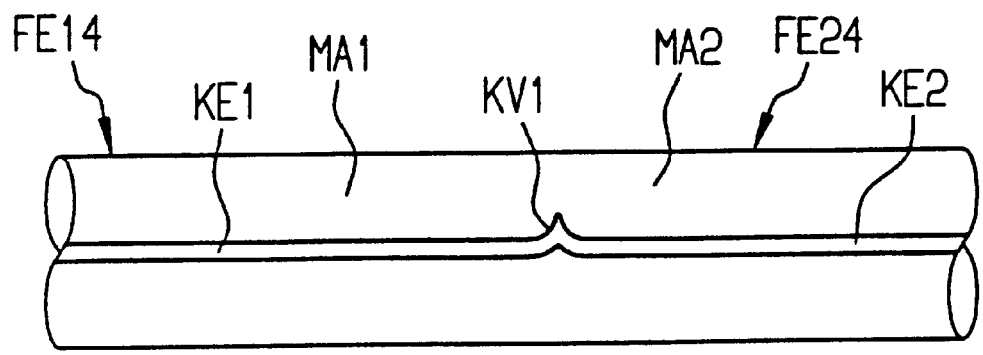
FIG. 11 is a diagrammatically enlarged view of the relationship of the finished fused connection of the two fiber ends moved by the distance of the feed path of FIG. 9.

Since, viewed in the X-direction, the gap region runs up too pointedly to the lower edges of the fibers FE14 and FE24 and expands to the upper edges thereof too much in the shape of a triangle, a material gap ML1 still remains in the upper part of the fibers pushed one inside the other directly after this process of excess travel of the second fiber FE24, because too little glass material was subsequently fed there. By contrast, in the lower part of the fused connection, too much material of the second fiber FE24 has been subsequently fed in the direction of the first fiber FE14. A thickened site VD1 consequently initially forms there. Because of its surface tension, a flow of material occurs from the thickened site VD1 to the material gap ML1, as indicated by arrows MF1 in FIG. 9. It can, as the case may be, happen as a result of this flow of material from the lower thickened site VD1 to the material gap ML1 in the upper part of the fused connection that the fiber cores are pressed in the direction of the flow of the glass material MF1. It is therefore possible for the fiber cores to be bent upward, as shown at the point KV1 in FIG. 11. At the same time, the fused glass material becomes largely homogeneous owing to this flow MF1, that is to say is distributed largely uniformly around the outer circumference of the fused connection, and results in the continuous circular cylindrical lateral glass surface of a constant outside diameter when viewed from the outside. By contrast, in the fiber interior, the fiber cores KE1 and KE2 are no longer aligned with one another at the splice point, but are bent in the direction of the flow of material. This will result in an undesirable increase in the attenuation of the finished fused connection.

Figure 10:
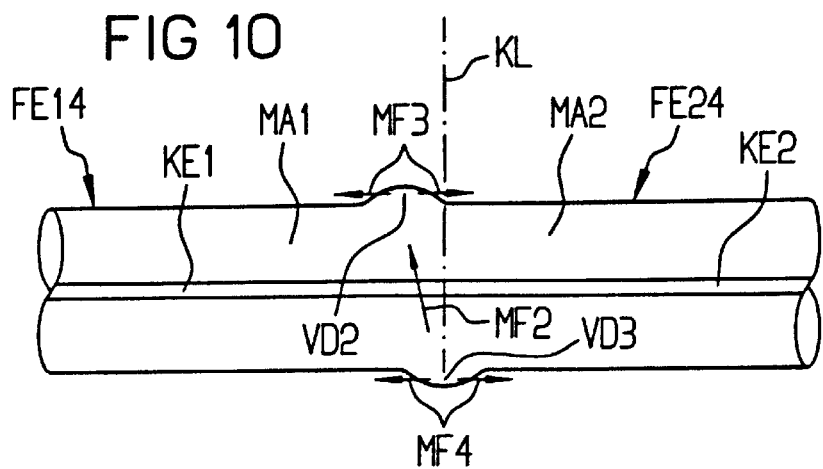
Figure 12:
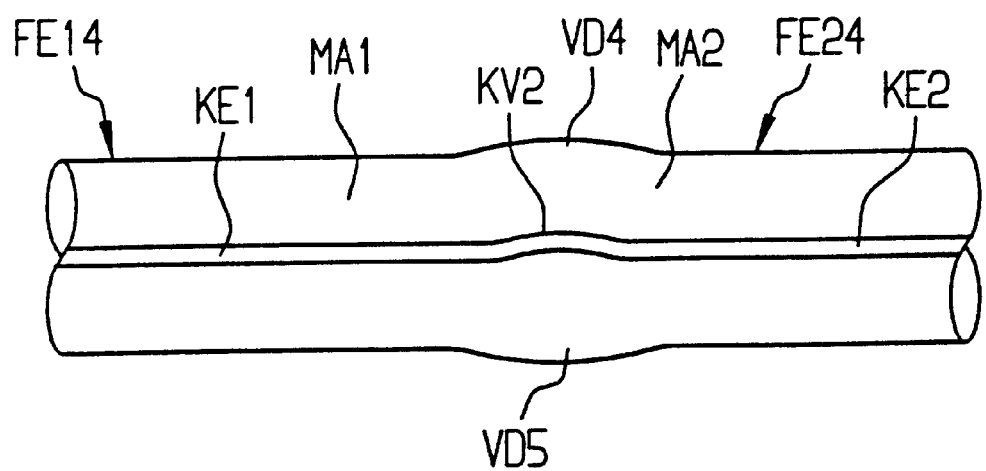
FIG. 12 is an enlarged diagrammatic view of the relationship of the finished fused connections of the two fiber ends moved by the distance of the feed path of FIG. 10.

Such a possible bending of the core can be largely counteracted in a simple way by carrying out overcompensation for any existing material deficit. This is illustrated in FIG. 10, which shows the fused connection between the two fibers directly after the feed movement or after the excess travel of the fibers one inside the other. By contrast with FIG. 9, the fiber excess travel in the upper part of the fused connection now also suffices to close the material gap and form a thickened site MF3 of fused glass material. Correspondingly thereto, the material thickening MF4 forms on the bottom side of the spliced joint on the outer circumference of the fiber arrangement. Since a material thickening MF3, MF4 now forms both on the top side and on the bottom side, that is to say on opposite longitudinal sides of the fiber fused connection, the result is that there is only a reduced flow of material from the lower to the upper thickened material site. This reduced flow of material is indicated by an arrow MF2 in FIG. 10. By contrast with FIG. 9, material thickenings MF3 and MF4 on both sides additionally cause a flow of material in the fiber longitudinal direction, which leads to a substantial leveling of the material thickenings. Owing to the reduced flow of material in the transverse direction of the longitudinal extent of the fiber cores, the latter are bent much less than in the case of the feed relationships according to FIGS. 9 and 11. FIG. 12 illustrates, after carrying out the fiber excess travel movement according to FIG. 10, the geometrical relationships of the fibers which are set out in the finished fused connection between the two fibers FE14 and FE24. By contrast with FIG. 11, their mutually fused fiber cores KE and KE2 have reduced bending or deflection KV2 in the region of their site of fused connection. Impermissibly high splice losses are avoided in this way. However, the price of this is a slight thickening of the outside diameter in the region of the splice point.

It is true, in summary, that the overcompensation for the material deficit is attended by fiber thickening in the region of the splice point. However, the splice point is far less critical with respect to the resulting transmission losses.

In order to also be able to fuse fiber ends of poor end face quality to one another in a largely optimum fashion, that is to say to keep the bending of the core as slight as possible and the outside diameter of the fibers as constant as possible even beyond the splice point, the overcompensation for the material deficit is expediently selected to be between one and five times the difference in length between the mutually opposite rupture edges of the respective fiber end. Expressed in a formula, the result is preferably a feed path VOZ6 of VOZ6=K·LD, referred to a single fiber, wherein K=1 to 5.

The deficit of the material volume which results, as the case may be, between the currently existing fiber end to be fused and the desired geometrical shape is preferably overcompensated for between 100% to 500%. Expressed in other words, this means that the control characteristic for the feed is selected to be steeper the larger the material deficit. However, this also leads to a more pronounced fiber thickening.

The invention is distinguished principally in that it is even also possible for fiber ends with faults to be fused to one another in a largely acceptable fashion. By virtue of the fact that the feed path of the fused fiber ends one inside the other is controlled as a function of the quality of the end faces, it is possible, in particular, to keep the bending of their fiber cores as slight as possible and simultaneously largely to avoid impermissibly overenlarging the outer circumference in the splice area by contrast with the original fiber outside diameter. Moreover, it is particularly advantageous that the components required to realize the method according to the invention are present in any case in conventional splicers. As a result, the method according to the invention can even be integrated subsequently in the cost-effective fashion into such splicers.

Figure 13:
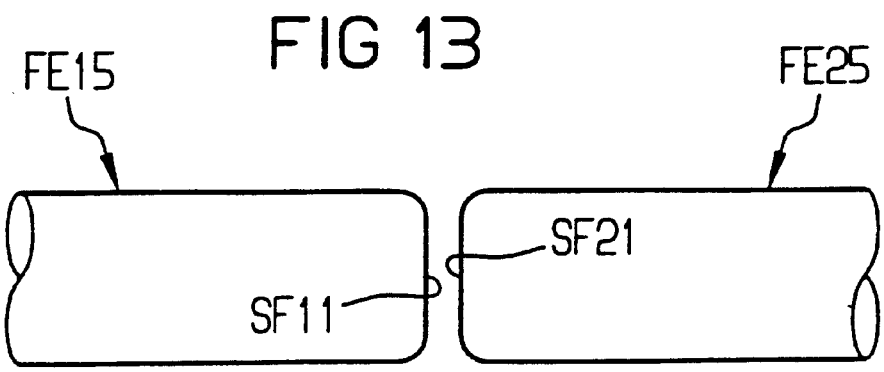
FIG. 13 is an enlarged diagrammatic representation of another pair of optical fibers which are to be fused to one another.
Figure 14:
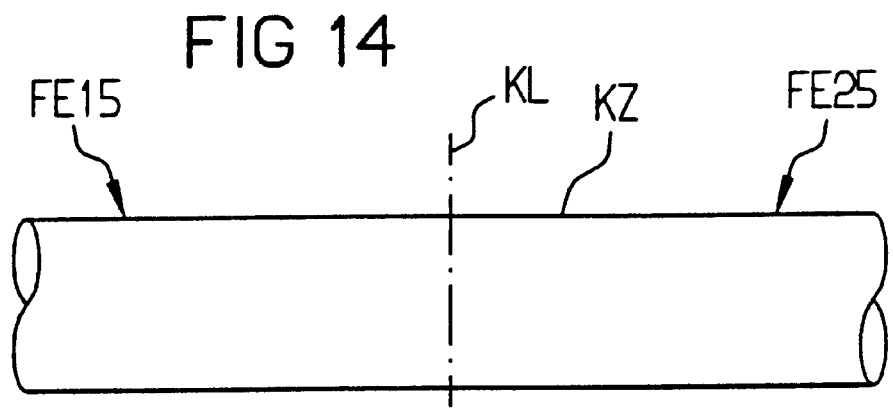
FIG. 14 is an enlarged diagrammatic representation of the associated fuse connection of the fibers of FIG. 13 pushed by a given amount.
Figure 15:
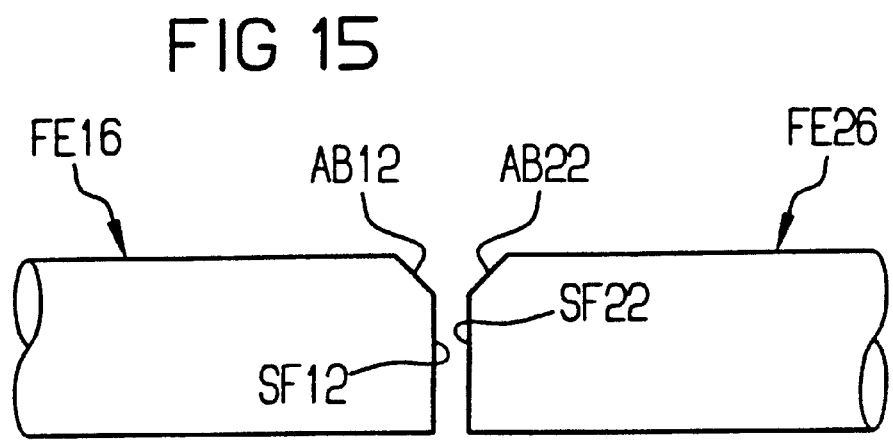
FIG. 15 is an enlarged diagrammatic representation of yet another pair of optical fibers which are to be fused together.
Figure 16:
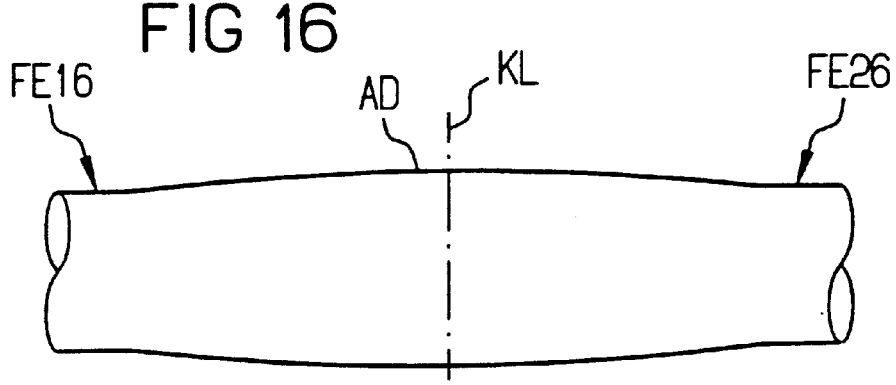
FIG. 16 is an enlarged diagrammatic representation of the fused optical connection between the fibers of FIG. 15, which have been moved the constant distance of the fibers of FIG. 14.
Figure 17:
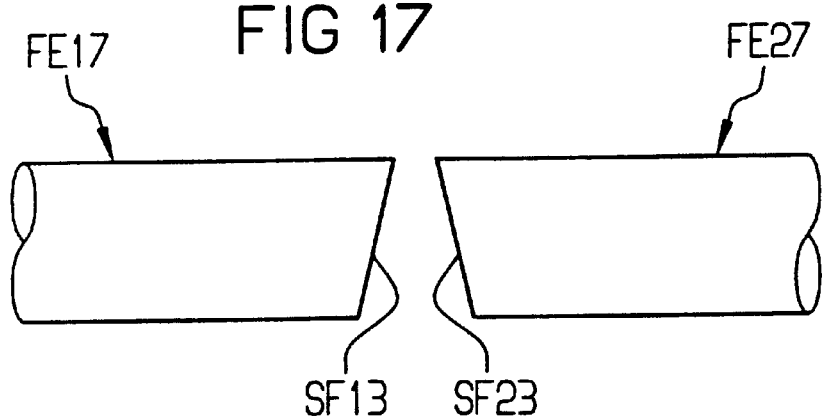
FIG. 17 is an enlarged diagrammatic representation of another pair of fibers to be fused together.
Figure 18:
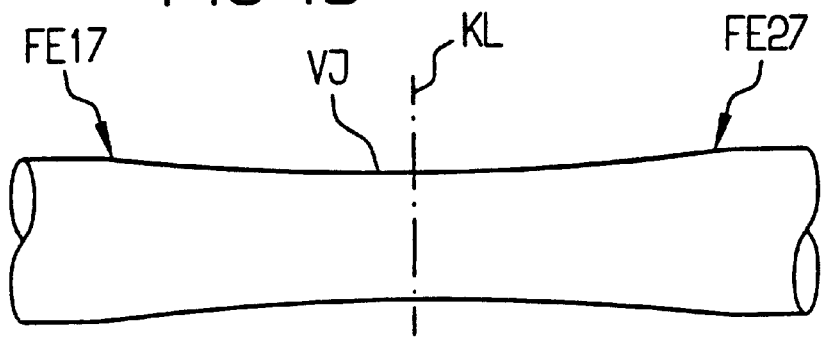
FIG. 18 is a diagrammatic representation of the fibers of FIG. 17 which have been fused together by being moved a constant distance of FIGS. 14 and 16.

FIGS. 14, 16 and 18 show, in a diagrammatic and enlarged representation, the respectively resulting associated fused connection for two fiber ends each, to be fused to one another, of the fiber pairs of FIGS. 13, 15 and 17, whose incipiently fused end faces have been respectively pushed one inside the other, by the same amount or with the same constant feed path.

The two rounded end faces SF11 and SF21 of the two fibers FE1 and FE2 of FIG. 13 are moved one inside the other only by a feed path which is such as to produce precisely a largely circular cylindrical fused connection KZ in FIG. 14.

If this excess fiber travel is kept constant, that is to say set in a fixed fashion, that would lead to impermissible fused connections in the case of fiber ends with faults in the end faces. For example, in FIG. 17, the two fiber ends have skewed end faces SF13 and SF23. Were these to fiber ends to be moved one inside the other by means of the same fiber excess travel set to be constant as the fiber ends in FIG. 13, this feed path would be too short. The result would be an impermissibly high distortion of the fiber cores owing to the resultant flow of glass material in the direction transverse to the axis, with respect to the original fiber longitudinal axes, as well as an impermissibly narrow tapering at the splice point, which is illustrated in FIG. 18 by the element VJ. By contrast, if the two fiber ends to be fused to one another had only microscopically small fiber excisions at their end faces, such as, for example, AB12 and AB22 of FIG. 15, and were moved one inside the other with the same constant feed path as the two fibers of FIG. 13, the feed path would be too long, that is to say too much glass material would be moved into the fused region resulting in a thickening, which is illustrated at AD in FIG. 16.

By contrast, the method according to the invention operates with a feed path which is matched in an individual fashion to the respectively existing end face quality of the fiber ends to be fused to one another so that it is matched anew from splice to splice. The feed path is optimally set individually in this case for each fiber pair to be connected to one another, that is to say individually as a function of the end face quality thereof, specifically so as to result neither in excessive thickening nor in a taper at the splice point. Consequently, the lowest possible splice loss is achieved in each case independent of the respectively existing end face quality of the fiber ends to be fused to one another, specifically while, at the same time, largely maintaining the original fiber outside diameter.

The splicing method according to the invention can be realized in conventional splicers in a very simple and cost-effective way, since these mostly also include an imaging optical system, video camera and electronic evaluation system for automatically assessing the end face quality of the fiber ends to be fused to one another. As a result, the feed path can be controlled without a large additional outlay, in particular in a fully automated fashion, that is to say without intervention by the user. Of course, it is also possible, if appropriate, to conceive of a manual mode of procedure in which, for example, the splicer user assesses the fiber end face by viewing the fiber image and inputs a corresponding correction value for the feed path at the splicer. This can certainly be of interest for simple splicers in which the lack of a video system renders automatic assessment of the end face quality impossible.

The thermal fusing of two optical waveguides preferably comprises the following operating steps:

Aligning the fiber ends in a flush fashion and setting them at a slight longitudinal spacing from one another;

Heating the fiber ends up to the melting point;

Moving the fiber ends together; and

Keeping the fiber ends at the melting point until a homogeneous connection has been formed.

If the fused fiber ends are brought together, that is to say moved together one inside the other, such that the process is optimized using the principles according to the present invention, a largely acceptable, that is to say optimized, fused connection is thereby formed, whose cross-sectional geometry is largely identical to the original fiber geometry of a continuous optical fiber. This means that in the region of the splice point, the mutually fused fiber cores of the two optical fibers continue to run largely undisturbed along a common line of alignment, that is to say above all bending, but also tapering of the fiber cores are largely avoided. This is achieved, in particular, by dimensioning the feed path so that possible material deficits caused by the material vaporizations, material excisions or faults in the angle of fracture in the end faces are corrected or overcompensated for. Thus, on the one hand, core bending is counteracted as far as possible, while, on the other hand, the fiber thickening possibly resulting therefrom is kept as slight as possible.

The feed path is advantageously selected so as to achieve the minimum possible attenuation under the given circumstances.

In the discussion relating to FIGS. 1–18, the inventive adaptation of the feed path is realized in each case, in particular, by virtue of the fact that the fixed fiber longitudinal spacing is set before or at the start of the fusing operation. After expiration of the fusing time, the fibers are moved together by a variable total movement path. The total movement path is composed, in this case, of the fixedly set longitudinal spacing plus the variable feed path.

It is also possible, instead of this, for the fiber longitudinal spacing at which the two fiber ends are opposite one another, viewed in the fiber longitudinal direction, before the start of the fusing operation to be varied instead of the total movement path. The total movement path of the fibers then always remains the same. In return, the longitudinal spacing is set in each case so that the feed corresponds to the inventive value. For this purpose, the longitudinal spacing is selected to be shorter the poorer the end face quality. In both cases, however, the final effect is that the feed or excess travel is variable.

In FIGS. 1–12, the fusing device SE was used merely to move the second fiber in the Z-direction onto the first fiber, which was fixed with reference to the Z-direction. Of course, the fiber excess travel according to the invention can also be produced by additionally, or independently thereof, moving the first fiber correspondingly.

Although various minor modifications may be suggested by those versed in the art, it should be understood that I wish to embody within the scope of the patent granted hereon all such modifications as reasonably and properly come within the scope of my contribution to the art.

I claim:

1. A method for thermal fusing two mutually assigned optical fiber ends, said method comprising the steps of determining for each end face of the optical fiber ends an amount of departure from a desired end face shape, heating the end faces and pushing one end face inside the other end face in the fiber longitudinal direction beyond the end face by a feed path determined by the amount of departure.

2. The method according to claim 1, wherein the step of determining utilizes, as a desired end face, an end face having a substantially planar fiber end face extending substantially perpendicular to a central axis of the fiber.

3. The method according to claim 1, wherein the step of determining the amount of departure comprises recording an optical image of the respective end face in at least one projection plane and evaluating information from the optical image to make the determination.

4. The method according to claim 1, wherein the step of determining comprises determining at least one departure criterion for a difference between a respective fiber end face and a desired end face shape.

5. The method according to claim 4, wherein the step of determining the departure criterion includes recording an optical image of a respective fiber end in at least one projection plane and evaluating information from the optical image to determine the departure criterion from the image information.

6. The method according to claim 4, wherein the end faces have rupture edges and wherein the step of determining the departure criterion comprises determining the longitudinal spacing by which the two end face rupture edges are mutually offset in the fiber longitudinal direction.

7. The method according to claim 4, wherein the step of determining the departure criterion comprises determining an angle by which the end face of the fiber end is skewed with respect to the desired end face.

8. The method according to claim 4, wherein the step of determining the departure criterion comprises determining an amount of material missing from the respective fiber end compared with the desired end face.

9. The method according to claim 4, wherein the step of pushing the fused fiber ends one inside the other is controlled on the basis of the amount of the determined departure criterion.

10. The method according to claim 3, wherein the step of evaluating the image information comprises determining at least one criterion for the fiber end.

11. The method according to claim 1, further comprising aligning two fiber end faces flush with one another before they are fused.

12. A device for thermally fusing two mutually aligned optical fiber ends, the fiber ends having a shape, said device including means for incipiently fusing the fiber ends, means for pushing one of the incipiently fused fiber ends inside the other in a fiber longitudinal direction a predetermined distance, the predetermined distance being determined by the amount of departure of the end face shape from a desired end face shape.

13. The device according to claim 12, wherein the pushing means are a constituent of an optical waveguide splicer.

14. The device according to claim 12, further including means for creating an optical image of the end of the optical fiber ends and for recording the optical image of said optical fiber ends.

15. A method for thermal fusing two optical fibers at respective ends, each fiber end having a face with a shape, said method comprising the steps of:

determining for each end face a difference between the shape of the end face and a desired end face shape;

holding at least one of the fibers;

heating the end faces of both fibers; and pushing the unheld fiber in a longitudinal direction toward the held fiber such that the end face of the pushed fiber is pushed through the other end face by an amount corresponding to the difference of the shape of the end faces from the desired end face shape.

16. The method according to claim 15, wherein the desired end face comprises a substantially planar fiber end face that is substantially perpendicular to a central axis of the fiber.

17. The method according to claim 15, further comprising the step of holding the two optical fibers at a predetermined temperature until a homogeneous connection has been formed.

18. The method according to claim 15, wherein the step of determining the difference between the end face and the desired end face shape comprises recording an optical image of the respective end face in at least one projection plane and evaluating information from the optical image to make the determination.

19. The method according to claim 15, wherein the end faces have rupture edges and wherein the step of determining the difference between the end face and the desired end face shape comprises determining the longitudinal spacing between the two end face rupture edges are offset in a direction along the optical fibers.

20. The method according to claim 15, wherein the step of determining the difference between the end face and the desired end face shape comprises determining an angle at which the end face of the fiber end is skewed with respect to the desired end face.

* * * * *